United States Patent [19]

Cooper et al.

[11] Patent Number: 4,639,817

[45] Date of Patent: Jan. 27, 1987

[54] PROTECTIVE RELAY CIRCUIT FOR DETECTING ARCING FAULTS ON LOW-VOLTAGE SPOT NETWORKS

[75] Inventors: John H. Cooper, Murrysville; William H. South, McKeesport, both of Pa.

[73] Assignee: Westinghouse Electric Corp., Pittsburgh, Pa.

[21] Appl. No.: 610,539

[22] Filed: May 15, 1984

[51] Int. Cl.⁴ .................................................. H02H 3/22
[52] U.S. Cl. .......................................... 361/62; 361/86; 361/88; 361/113
[58] Field of Search .................... 361/62, 63, 65, 86, 361/87, 88, 90, 91, 92, 113; 324/51, 86, 107, 108

[56] References Cited

U.S. PATENT DOCUMENTS

| | | | |
|---|---|---|---|
| 3,192,442 | 6/1965 | Warrington et al. | 361/80 |
| 3,887,915 | 6/1975 | Olsen et al. | 361/113 |
| 3,970,897 | 7/1976 | Tamir et al. | 361/78 |
| 4,333,050 | 6/1982 | Yeasting | 361/90 |
| 4,409,636 | 10/1983 | Brandt et al. | 361/87 |

Primary Examiner—A. D. Pellinen
Assistant Examiner—Jeffrey A. Gaffin
Attorney, Agent, or Firm—W. E. Zitelli

[57] ABSTRACT

A protective relay for detecting power arcing faults on a low-voltage spot network. The protective relay can monitor the voltage difference between each phase conductor, the voltage difference between each phase conductor and the neutral conductor, or the current on each phase conductor. Using one of these three sets of values, the protective relay first filters the input signal so that only frequencies indicative of a power arcing fault on the low-voltage spot network are analyzed. The signals passed by the filter are amplified, rectified, and averaged and the peak of each signal detected. If the peak has a duration longer than a predetermined value, a fault indication is provided.

4 Claims, 4 Drawing Figures

PROTECTIVE RELAY CIRCUIT FOR DETECTING ARCING FAULTS ON LOW-VOLTAGE SPOT NETWORKS

BACKGROUND OF THE INVENTION

1. Field of the Invention

This invention relates generally to an apparatus for detecting power arcing faults, and more specifically, to such an apparatus for detecting power arcing faults on low-voltage spot networks.

2. Description of the Prior Art

Low-voltage electrical power networks consist of interlaced loops or grid systems. These systems are always supplied with electrical energy by two or more power sources, so that the loss of any one source does not result in a power interruption. Such systems provide the highest level of reliability possible with conventional power distribution and are normally used to serve high-density load areas. Primary applications include central or downtown city areas, large buildings, shopping centers, and some industrial plants. These network systems are of either the grid type or spot type with three-phase three-wire or three-phase four-wire service at 208Y/120V or 480Y/277V.

A grid-type network includes a plurality of sources and loads arranged in a grid pattern. Each source has a dedicated feeder supplying the network via a high voltage switch, a network transformer, and a network protector. The network protector comprises a circuit breaker and protective relay, for isolating the transformer from the network bus when a fault occurs in the transformer or the primary circuit feeding it.

Large concentrated load areas, such as commercial buildings and shopping centers, are frequently served by spot networks, i.e., two or more network units fed by two or more primary feeders. Typically, the spot network primaries are tapped from non-dedicated feeders. The feeders are connected to the three-phase transformer primary, and the secondary thereof is connected to the network via a network protector and fuses. The typical low-voltage spot network installation is operated at a nominal voltage of 480 V (line-to-line voltage grounded wye configuration) and protected by fuses typically rated at 4,000 to 6,000A. As in the grid-type network, the network protector of a spot network isolates the transformer from the bus in the event of a fault in the transformer or the primary circuit feeding it. This arrangement ensures high reliability since primary faults are isolated and the network is carried by other feeders connected to it. The network protector is designed to open when the protective relay associated with it detects a fault on the primary feeder that would cause power flow from the network into the feeder, that is, reverse power flow. The network protector is not, however, designed to open for faults on the network itself. Also, the network protector is designed to open when the primary feeder is disconnected from its source of supply and magnetizing current flows from the secondary network into the network transformer. Typical network installations do not contain phase overcurrent or ground overcurrent protective relays or any form of overcurrent protection for the network, except for the fuses.

It is difficult to detect power arcing faults on the 480 V networks because the arc voltage limits the fault current to several thousand amperes or less, which is below full load current. As a result, the fuses do not open and extensive arc-burning damage may occur to the equipment in a spot network. One apparatus for detecting such power arcing faults is described in copending U.S. patent application Ser. No. 610,540 (filed May 15, 1984) This prior art patent application describes, in a general way, a device for detecting power arcs on a low-voltage spot network. The present invention represents an improvement to the prior art device by including means for discriminating between high-frequency harmonics caused by a power arcing fault and sporadic or steady-state high-frequency harmonics unrelated to a power arcing fault.

SUMMARY OF THE INVENTION

A protective relay for detecting power arcing faults involving a low-voltage spot network is disclosed. The present invention uses the phase-to-phase voltages or the phase-to-neutral voltages. The protective relay includes a voltage divider for providing a voltage suitable for use with the electronic components of the protective relay and bandpass filter and amplifying devices for proper signal conditioning. The signal is then rectified and averaged, and a peak detector, in conjunction with a timer, evaluates the magnitude and duration of the harmonics on the voltage signals. If the magnitude and duration exceed predetermined values, the protective relay produces a trip signal for opening the network protectors.

BRIEF DESCRIPTION OF THE DRAWINGS

The invention may be better understood, and further advantages and uses thereof more readily apparent, when considered in view of the following detail description of exemplary embodiments, taken with the accompanying drawings in which.

DESCRIPTION OF THE PREFERRED EMBODIMENTS

Figure 1:
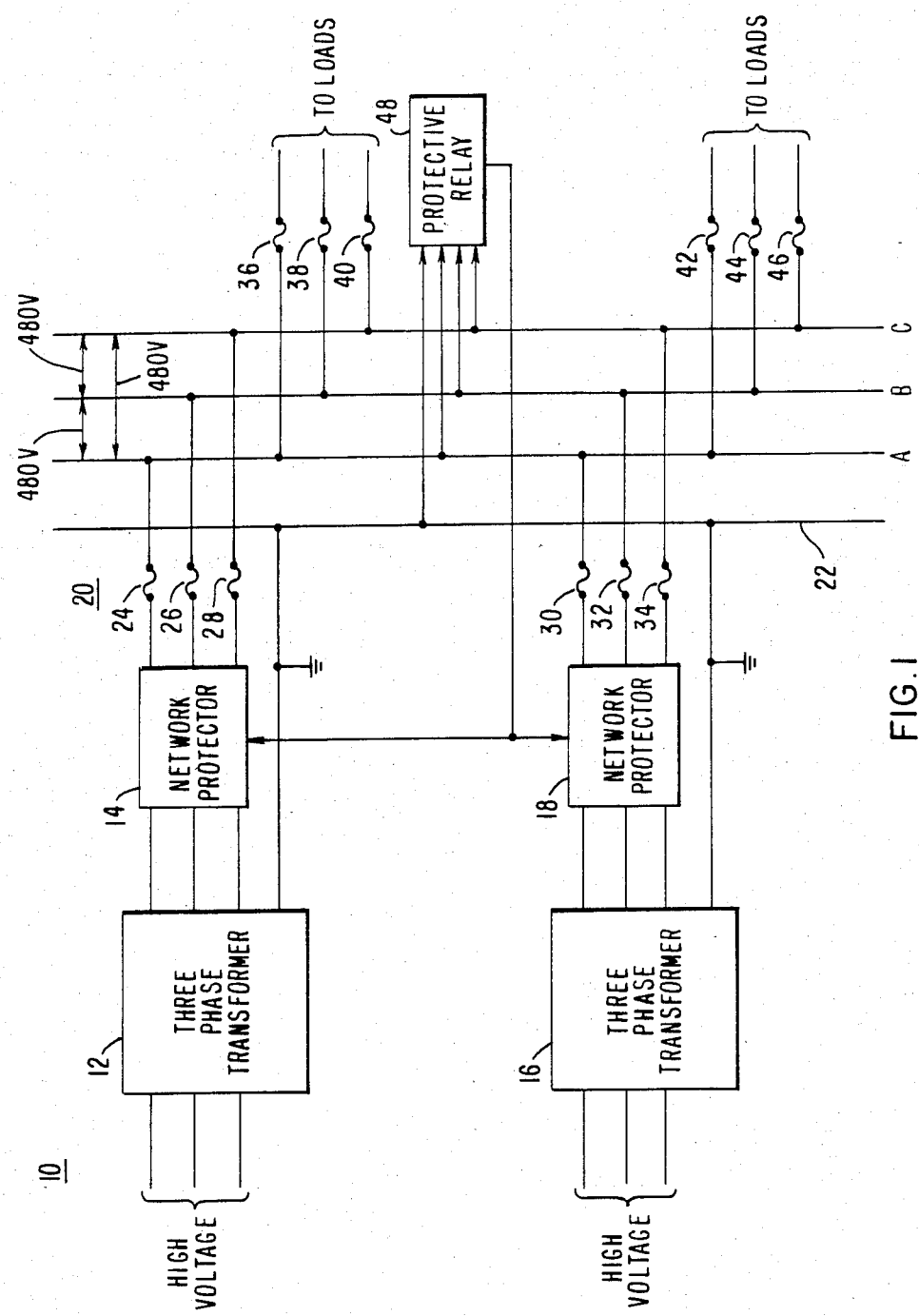
FIG. 1 is a block diagram of a low-voltage spot network including a protective relay constructed according to the teachings of the present invention.

Turning to FIG. 1, there is shown a block diagram of a low-voltage spot network 10 including a three-phase transformer 12 connected to a high voltage source (not shown in FIG. 1). The secondary winding of the three-phase transformer 12 is connected to input terminals of a network protector 14. The output terminals of the network protector 14 are connected to phase A, B, and C conductors via fuses 24, 26, and 28, respectively. The three-phase transformer 12 is also connected to a neutral conductor 22, which is grounded at several points. The low-voltage spot network 10 also includes a three-phase transformer 16 connected to a high-voltage source, not shown in FIG. 1. The secondary winding of the three-phase transformer 16 is connected to input terminals of a network protector 18. The output terminals of the network protector 18 are connected to the phase A, B, and C conductors via fuses 30, 32, and 34. The three-phase transformer 16 is also connected to the neutral conductor 22. In operation, the three-phase transformers 12 and 16 reduce the voltage level of the high voltage input thereto, providing a low-voltage to a bus 20. The bus 20 comprises the phase A, B, and C conductors and the neutral conductor 22. As previously discussed, the network protectors 14 and 18 disconnect the three-phase transformers 12 and 16, respectively, from the bus 20 to prevent reverse power flow and to isolate the three-phase transformers 12 and 16 when there is a fault on the high-voltage side of the three-phase transformers 12 and 16.

A load is connected to the bus 20 via fuses 36, 38, and 40. Another load is also connected to the bus 20 via fuses 42, 44, and 46. In other embodiments of low-voltage spot network 10 more than two high-voltage sources can feed electrical power to the bus 20, and the bus 20 can supply power to more than two loads.

A protective relay 48 is connected to the phase A, B, and C conductors and the neutral conductor 22 for detecting a power arcing fault on the bus 20. When a fault is detected, the protective relay 48 provides a signal to the network protectors 14 and 18 for opening the contacts thereof.

Figure 2:
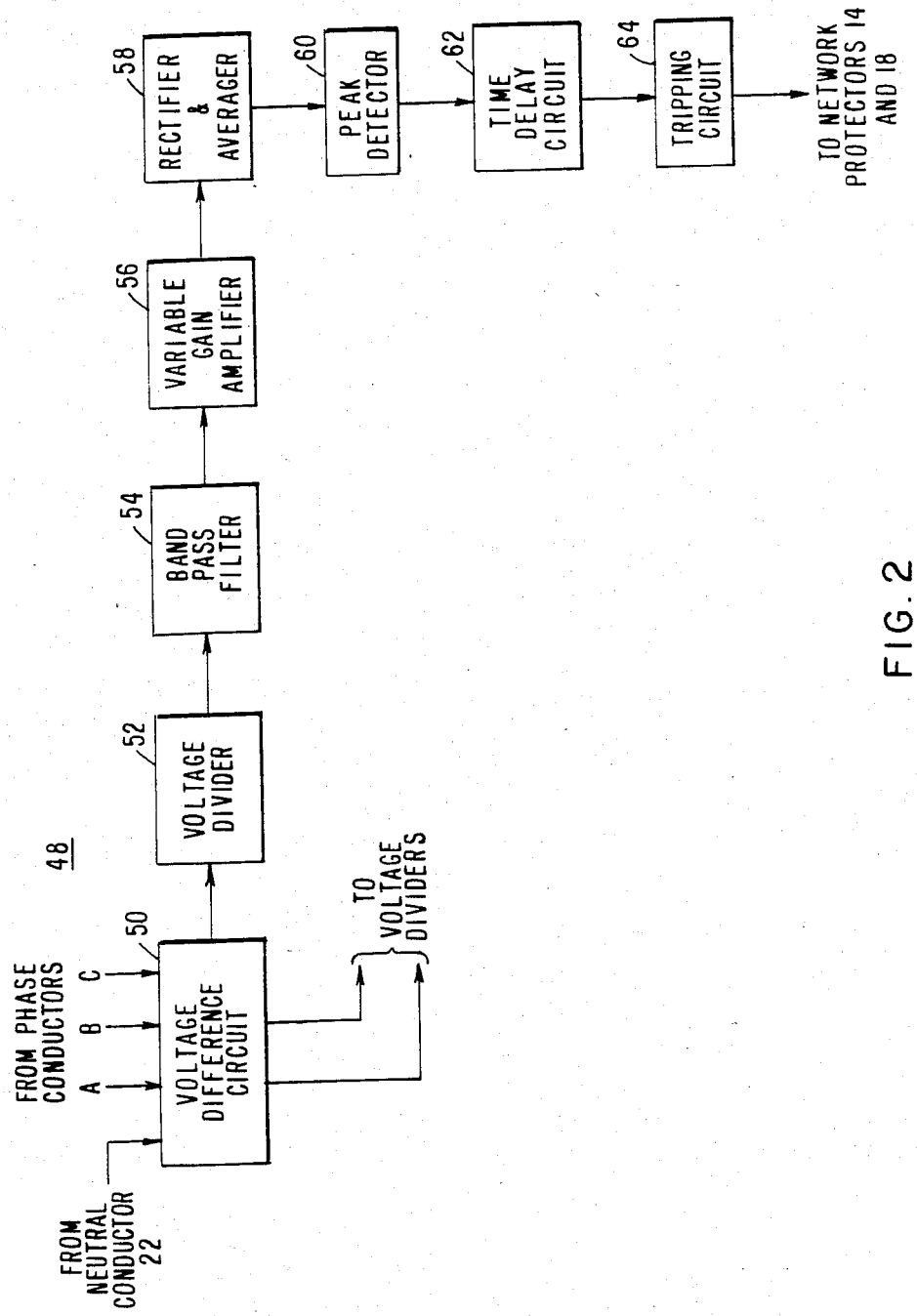
FIG. 2 is a block diagram of the protective relay of FIG. 1.

FIG. 2 is a partial block diagram of the protective relay 48 shown in FIG. 1. Voltage signals from the phase A, B, and C conductors are input to a voltage difference circuit 50. The neutral conductor 22 is also connected to the voltage difference circuit 50. The voltage difference circuit 50 provides three signals: a first signal representative of the voltage difference between the phase A conductor and the neutral conductor 22, a second signal representative of the voltage difference between the phase B conductor and the neutral conductor 22, and a third signal representative of the voltage difference between the phase C conductor and the neutral conductor 22. Referring to FIG. 2, the first signal is input to a voltage divider 52. FIG. 2 notes that the second and third signals are also input to voltage dividers similar in function and structure to the voltage divider 52. The voltage divider 52 reduces the voltage from the bus 20 to levels compatible with the solid-state electronic circuits of the protective relay 48. Either a transformer having a frequency response high enough to pass the predominant power arcing harmonic frequencies or a capacitive or resistive voltage divider can be used as the voltage divider 52. The signal from the voltage divider 52 is input to a bandpass filter 54. The bandpass filter 54 blocks the power frequency component and the lower order harmonics, which may be caused by multi-phase rectifier loads connected to the bus 20. In one embodiment of the protective relay 48 the bandpass filter has a pass band from 1 kHz to 100 kHz. The signal from the bandpass filter 54 is input to a variable gain amplifier 56 where the signal level of the high-frequency components are amplified. As will be illustrated in FIG. 3, the variable gain amplifier 56 also provides a sensitivity adjustment.

The signal from the variable gain amplifier is input to a rectifier and averager 58 where the oscillations caused by the high-frequency components of the power arc are rectified and a short time-average for these components is provided. The rectifier and averager 58 is for discriminating between signals produced by a power arc and those from other sources that produce sporadic high-frequency signals. The output signal from the rectifier and averager 58 is input to a peak detector 60. The peak detector 60 has a discharge time constant of several seconds to allow a time delay circuit 62 to reject momentary noise pulses, while providing a sufficiently high voltage level to activate the time delay circuit 62 during actual power arcing conditions. An output signal from the peak detector 60 is input to the time delay circuit 62, which in one embodiment has a time constant of 0.7 seconds. This time constant must allow sufficient time for protective devices in the load circuits to clear load-circuit faults (i.e., 0.1 to 0.5 seconds). An output signal from the time delay circuit 62 is input to a tripping circuit 64. The tripping circuit 64 is a conventional electromechanical device for energizing the trip circuit of the network protectors 14 and 18.

To analyze the second and third signals from the voltage difference circuit 50, the protective relay 48 includes second and third voltage dividers, bandpass filters, variable gain amplifiers, rectifiers and averagers, and peak detectors, (not shown in FIG. 2) each identical in structure and function to respectively, the voltage divider 52, the bandpass filters 54, the variable gain amplifier 56, the rectifier and averager 58, and the peak detector 60. The time delay circuit 62 and the tripping circuit 64 are common to the circuitry analyzing the first, second, and third signals from the voltage divider 52. Any one of the first, second, and third signals from the voltage difference circuit 50 can cause opening of the network protectors 14 and 18.

Figure 3:
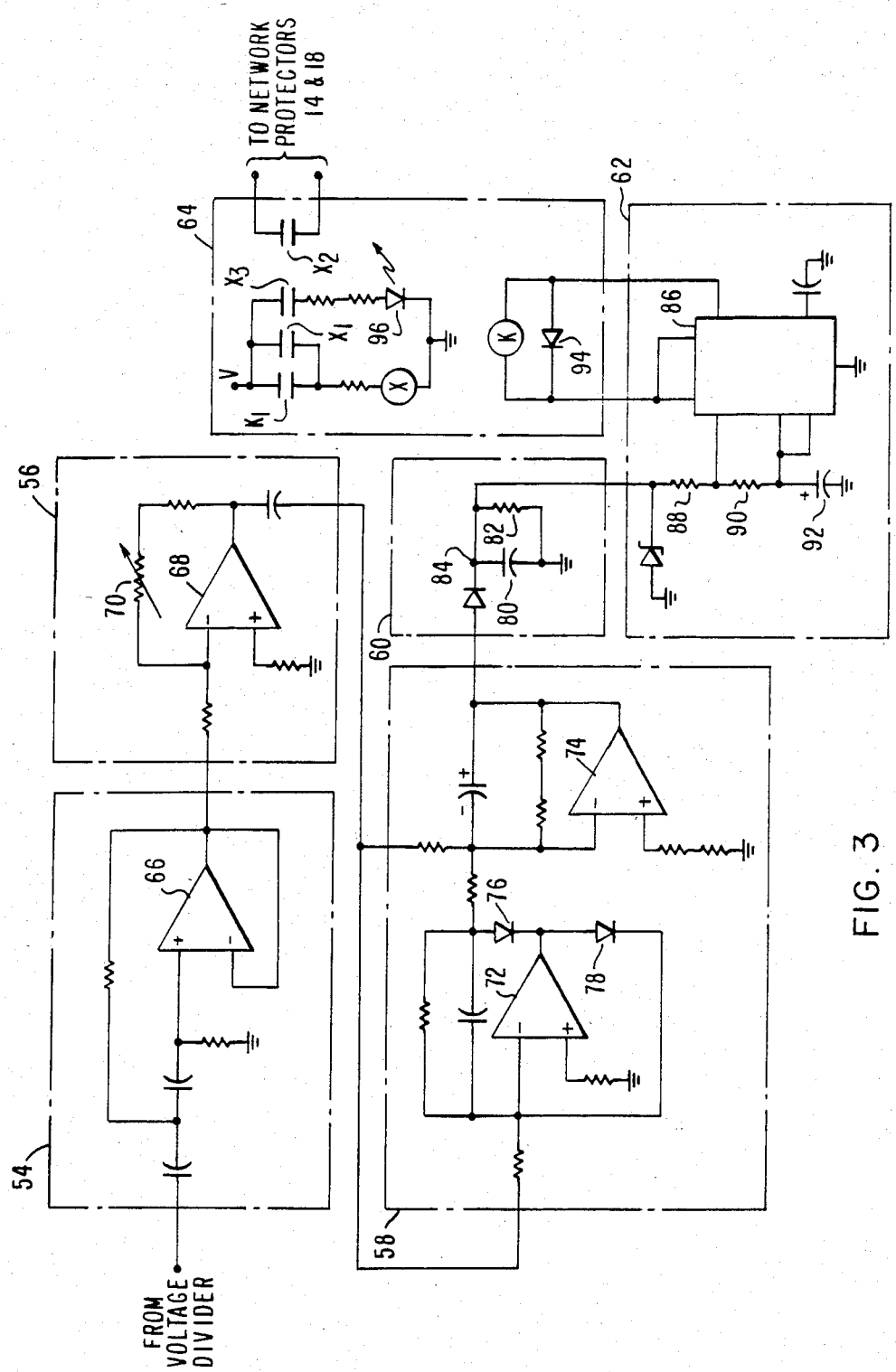
FIG. 3 is a detailed schematic diagram of the protective relay of FIG. 2.

FIG. 3 is an exemplary schematic diagram for implementing the various elements illustrated in FIG. 2. An operational amplifier 66 is connected in a bandpass filter configuration to provide the function of the bandpass filter 54. An operational amplifier 68, including a variable resistor 70, is configured to provide the function of the variable gain amplifier 56. The variable resistor 70 provides the sensitivity adjustment previously discussed. Operational amplifiers 72 and 74, and diodes 76 and 78 provide the rectifier and averaging function associated with the rectifier and averager 58. The peak detector 60 comprises a capacitor 80 and a resistor 82 connected between a terminal 84 and ground.

A resistor 88 is also connected to the terminal 84 and to ground via a series connection of a resistor 90 and a capacitor 92. The junction between the resistor 88 and the resistor 90 is connected to a first terminal of a timer 86. A junction between the resistor 90 and the capacitor 92 is connected to a second terminal of the timer 86. Third and fourth terminals of the timer 86 are connected to the supply voltage (designated $V_{CC}$) in FIG. 3. The supply voltage is also connected to a fifth terminal of the timer 86 via a parallel combination of a diode 94 and a relay coil K. In one embodiment, the timer 86 is the popular 555 integrated circuit.

In operation, the bandpass filter 54 passes a band of frequencies indicative of a power arcing fault on the bus 20. In one embodiment of the present invention the passband is 1,000 Hz to 100 kHz. Also, the operational amplifiers 72 and 74 have slew rates of approximately 10 V/$\mu$s, or better for proper operation for frequencies above approximately 50 kHz. After amplification, rectification, and averaging, the peak detector 60 sees a dc value representative of the magnitude of the signals passed by the bandpass filter 54. The capacitor 80 is charged by this dc signal, and discharges through the resistors 82, 88, and 90 and the capacitor 92. Due to the long discharge time constant associated with the capacitor 80, the capacitor 80 in effect remembers the highest magnitude of the dc signal and holds a charge representing this magnitude during a window time determined by the discharge time constant. Discharging of the capacitor 80 charges the capacitor 92 and if the charge on the latter reaches two-thirds of the supply voltage of the timer 86, the capacitor 92 discharges through the resistor 90 to ground via the first terminal of the timer 86. When the capacitor 92 discharges, the relay coil K is energized, closing the contact $K_1$. This energizes the relay coil X, closing contacts $X_1$, $X_2$, and $X_3$. The contact $X_1$ latches the relay coil X in the closed position. The contact $X_2$ trips the network protectors 14 and 18, and the contact $X_3$ provides current to an LED 96 causing the latter to light, thereby indicating that a trip signal has been sent to the network protectors 14 and 18. The diode 94 protects the timer 86 from transient voltages when the relay coil K is deenergized.

A second embodiment (not shown) of the protective relay 48 uses the current on each phase conductor, rather than the voltage between each phase conductor and the neutral conductor, to determine the presence of harmonics and therefore a power arcing fault. Such an embodiment would require the use of three current transformers, one current transformer on each phase conductor in the well-known configuration. A third embodiment uses the three phase-to-phase voltages to detect a power arcing fault. Means for providing phase-to-phase voltages are well known in the art.

Figure 4:
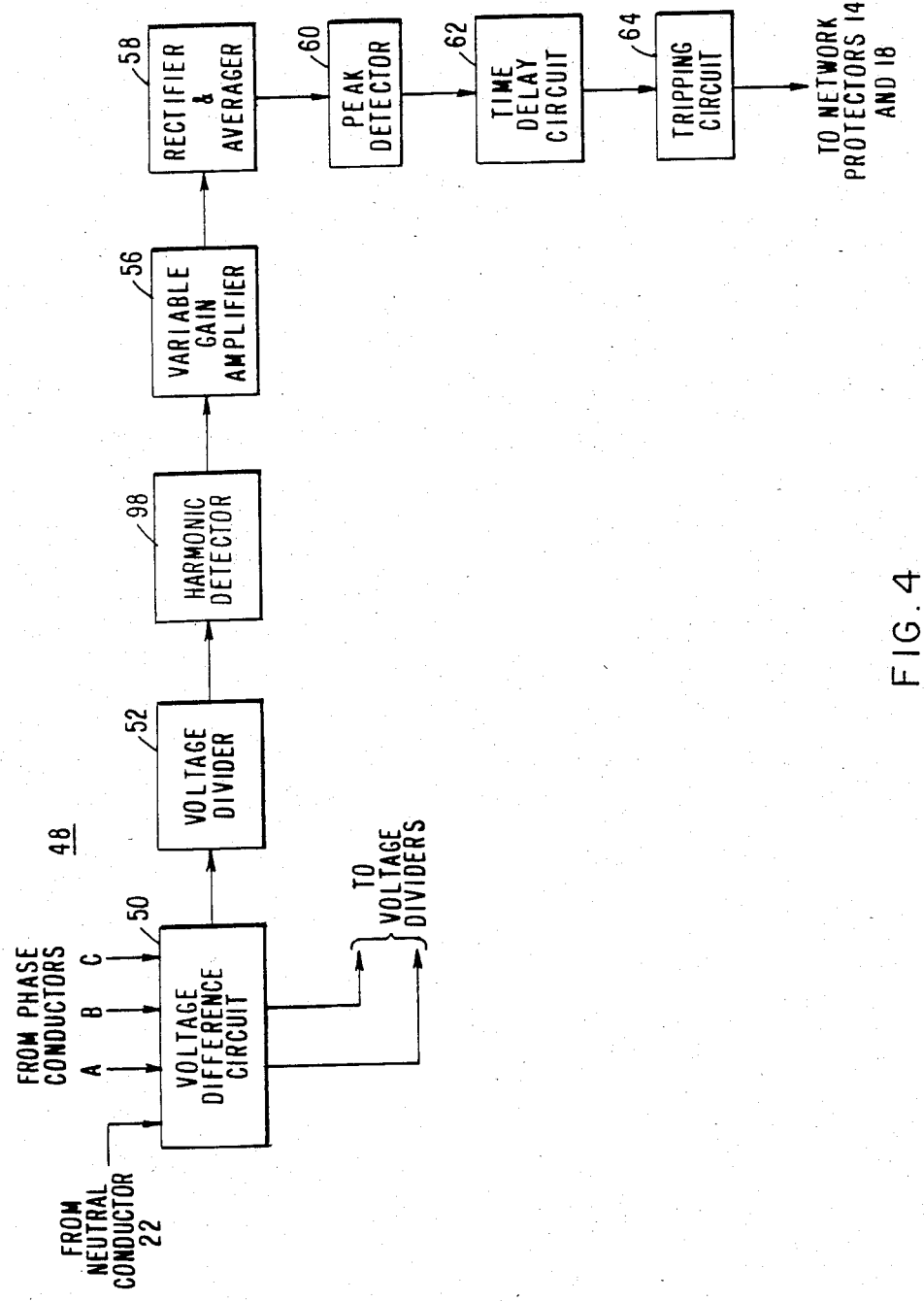
FIG. 4 is a block diagram of a second embodiment of the protective relay of FIG. 2.

FIG. 4 shows a fourth embodiment of the present invention. The components of FIG. 4 are identical in structure and function to the components bearing identical reference characters in FIG. 1. In FIG. 4 the bandpass filter 54 of FIG. 2 has been replaced by a harmonic detector 98. The harmonic detector 98 is more sophisticated than the bandpass filter 54, and the harmonic detector 98 would include multiple notch filters for passing specific harmonic frequencies. Also, the harmonic detector 98 could examine the ratio between two specific harmonic frequencies, thereby making the protective relay 48 more sensitive to harmonics caused by the power arc fault and less sensitive to those due to naturally occurring events in the low-voltage spot network 10.

What is claimed is:

1. A protective relay for detecting a power arc fault in an AC three-phase electrical power spot network including a bus having phase A, B, and C conductors and a neutral conductor for distributing power to at least one load, a plurality of power sources for supplying power to said bus, and means for interrupting power to said bus from said plurality of power sources, said protective relay comprising:

means coupled to each of the phase A, B, and C conductors and the neutral conductor to provide a first voltage signal representative of the voltage difference between the phase A conductor and the neutral conductor, to provide a second voltage signal representative of the voltage difference between the phase B conductor and the neutral conductor, and to provide a third voltage signal representative of the voltage difference between the phase C conductor and the neutral conductor, each voltage signal representing its corresponding phase voltage fundamental frequency and all phase voltage harmonics thereof which are present on the corresponding phase conductor;

first, second, and third bandpass filter means corresponding to said first, second, and third voltage signals respectively, each bandpass filter means for passing only a predetermined band of harmonic frequency components of its corresponding voltage signal to produce first, second, and third filtered signals, said predetermined band of harmonic frequencies including frequencies substantially between 1 kHz and 100 kHz, thereby being limited substantially to include only harmonic frequencies which are indicative of power arc faults;

first, second, and third amplifier means responsive to said first, second, and third filtered signals, respectively, to produce first, second, and third amplified signals;

first, second, and third rectifier means for rectifying and averaging the harmonic frequency components of said first, second, and third amplified signals to produce first, second, and third rectified signals in response thereto;

first, second, and third peak detector means which produce first, second, and third peak signals representative of the peaks of said first, second, and third rectified signals, respectively; and timer means which indicates a fault when one of said first, second, and third peak signals is substantially at at least a predetermined magnitude for a specified time interval, thereby indicating the presence of a permanent power arc fault.

2. The protective relay of claim 1 wherein the protective relay activates the interruptings means when a fault is indicated.

3. The protective relay of claim 1 wherein each of the first, second, and third bandpass filter means includes a multiple-notch filter means for passing only predetermined frequencies related to the power arc fault-caused harmonics on the bus.

4. The protective relay of claim 3 including means for determining the ratio of the harmonics passed by the multiple notch filter means.

* * * * *